(12) United States Patent
Otani et al.

(10) Patent No.: US 6,720,548 B2
(45) Date of Patent: Apr. 13, 2004

(54) OPTICAL SAMPLING WAVEFORM MEASURING APPARATUS AIMING AT ACHIEVING WIDER BAND

(75) Inventors: Akihito Otani, Atsugi (JP); Toshinobu Otsubo, Atsugi (JP); Hidehiko Takara, Yokosuka (JP); Ippei Shake, Yokohama (JP); Satoki Kawanishi, Yokohama (JP)

(73) Assignees: Anritsu Corporation, Tokyo (JP); Nippon Telegraph & Telephone Corporation, Tokyo (JP)

( * ) Notice: Subject to any disclaimer, the term of this patent is extended or adjusted under 35 U.S.C. 154(b) by 172 days.

(21) Appl. No.: 10/095,982

(22) Filed: Mar. 12, 2002

(65) Prior Publication Data

US 2002/0139924 A1 Oct. 3, 2002

(30) Foreign Application Priority Data

Mar. 15, 2001 (JP) ........................................ 2001-074684

(51) Int. Cl.$^7$ ............................ G02F 1/01; H04B 10/08; H04J 14/06
(52) U.S. Cl. ............................ 250/225; 398/9; 398/25; 398/26; 398/65
(58) Field of Search .......................... 250/225; 398/65, 398/24, 26, 9, 25

(56) References Cited

U.S. PATENT DOCUMENTS

| | | | |
|---|---|---|---|
| 4,510,402 A | | 4/1985 | Summers et al. |
| 4,997,595 A | * | 3/1991 | Kurihara et al. .............. 252/587 |
| 6,396,601 B1 | * | 5/2002 | Takara et al. .................. 398/9 |
| 2003/0043366 A1 | * | 3/2003 | Ohta et al. .................. 356/121 |

FOREIGN PATENT DOCUMENTS

| | | |
|---|---|---|
| JP | 2-311722 A | 12/1990 |
| JP | 09-159536 A | 6/1997 |

OTHER PUBLICATIONS

H. Takara et al "Eye–Diagram Measurement of 100 Gbit/s Optical Signal Using Optical Sampling", $22^{nd}$ European Conference on Optical Communication (1996, Oslo) ThB. 1.2, pp. 4.7 to 4.10.
Patent Abstracts of Japan, vol. 015, No. 103, Mar. 12, 1991 and JP 02–311722 A (NTT), Dec. 27, 1990—Abstract only.
Patent Abstracts of Japan, vol. 17, No. 332, Jun. 23, 1993 and JP 05–040287 A (NTT), Feb. 19, 1993—Abstract only.

* cited by examiner

Primary Examiner—David Porta
Assistant Examiner—David C. Meyer
(74) Attorney, Agent, or Firm—Frishauf, Holtz, Goodman & Chick, P.C.

(57) ABSTRACT

A nonlinear optical crystal is composed of 2-adamantyl-5-nitorpyridine (AANP) allowing the type 2 phase matching to the sampling light and a measuring object light, emitting a sum frequency light of the measuring object light and the sampling light, with the polarization directions thereof being perpendicular to each other, when the sampling light and measuring object light multiplexed by a multiplexer are entered. When the sum frequency light is emitted through the nonlinear optical crystal, a control portion controls the polarization direction of the sampling light so as to be parallel to a predetermined reference axis located within a plane perpendicular to a phase matching direction of the nonlinear optical crystal. The predetermined reference axis is a single axis maintaining parallelism with the crystal axis of the nonlinear optical crystal even if the wavelength of the inputted light is changed.

3 Claims, 10 Drawing Sheets

FIG. 7A Wavelength of measuring object beam (fHz)

FIG. 7B Sampling optical pulse (f−ΔfHz)

FIG. 7C Sum frequency beam (waveform of correlative signal) (ΔfHz)

F I G. 13  Elevation angle dependency of SHG conversion efficiency

Elevation angle dependency of SHG conversion efficiency

OPTICAL SAMPLING WAVEFORM MEASURING APPARATUS AIMING AT ACHIEVING WIDER BAND

CROSS-REFERENCE TO RELATED APPLICATIONS

This application is based upon and claims the benefit of priority from the prior Japanese Patent Application No. 2001-074684, filed Mar. 15, 2001, the entire contents of which are incorporated herein by reference.

BACKGROUND OF THE INVENTION

1. Field of the Invention

The present invention relates to an optical sampling waveform measuring apparatus and more particularly to an optical sampling waveform measuring apparatus aiming at a wider band when measuring an optical pulse waveform of an optical signal used for an optical communication and the like with a sum frequency generation light (SFG light).

2. Description of the Related Art

Generally, when constructing a new optical communication system, manufacturing a new optical transmission apparatus or inspecting such optical communication system and optical transmission apparatus periodically, it is important to measure a pulse waveform of a digital optical signal to be transmitted received in order to grasp the quality of the optical communication.

In recent years, transmission velocity of information in optical communication has been increased and currently, high-speed optical transmission of 10 Gbit/s or more has been planned.

Jpn. Pat. Appln. KOKOKU Publication No. 6-63869 has disclosed an optical sampling waveform measuring apparatus for measuring an optical pulse waveform of high-speed optical signals of more than 10 Gbit/s with the sum frequency generation light.

FIGS. 7A, 7B and 7C and FIGS. 8A and 8B explain the measuring principle of the optical sampling waveform measuring apparatus disclosed in this Jpn. Pat. Appln. KOKOKU Publication No. 6-63869.

Figure 7A:
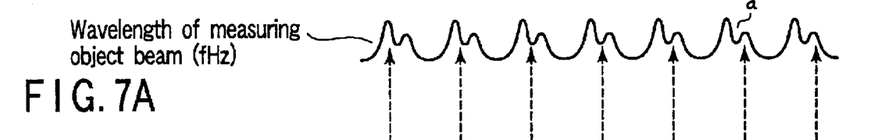
FIGS. 7A, 7B and 7C are diagrams for explaining a measurement principle of an optical pulse waveform measurement for an optical signal using a sum frequency light.
Figure 7B:
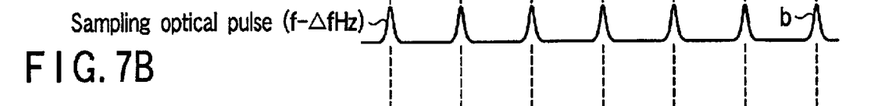
Figure 7C:
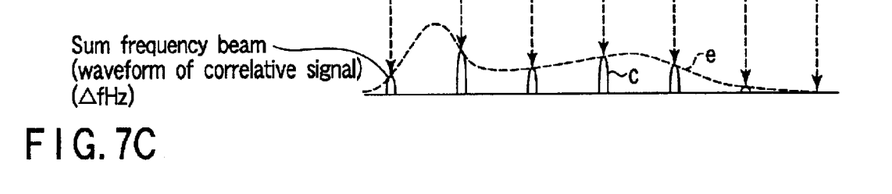

For example, if a measuring object light "a" having repetition frequency "f" of the pulse waveform of measurement object and a sampling light "b" having a pulse width by far narrower than the pulse width of the measuring object light "a" and having a repetition frequency (f−Δf) slightly lower than the repetition frequency "f" of the measuring object light "a" are entered into a nonlinear optical material 1 allowing type 2 phase matching to the measuring object light "a" and the sampling light "b" simultaneously, only when the two lights "a" and "b" overlap each other at the same time, a sum frequency light "c" proportional to a product of the intensities of these two lights "a" and "b" is outputted from the nonlinear optical material 1.

Because the repetition frequency of this sum frequency light "c" is the repetition frequency (f−Δf) of the sampling light "b", response velocity of a photo-electric converter which converts this sum frequency light "c" to an electric signal only has to be higher than the repetition frequency (f−Δf).

Further, because the time resolution of this photo-electric converter is determined depending on the pulse width of the sampling light "b", if the envelope waveform of this electric signal is obtained after the sum frequency light "c" is converted to an electric signal by means of this photo-electric converter, the shape of the envelope of this electric signal is an optical pulse waveform "e" of the measuring object light "a" enlarged on time axis.

Next, the sum frequency light and phase matching will be described below.

Figure 8A:
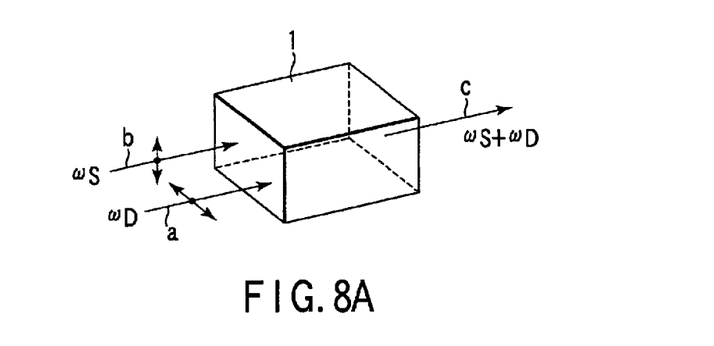
FIGS. 8A and 8B are diagrams for explaining optical characteristic of a nonlinear optical material maintaining type 2 phase matching.
Figure 8B:
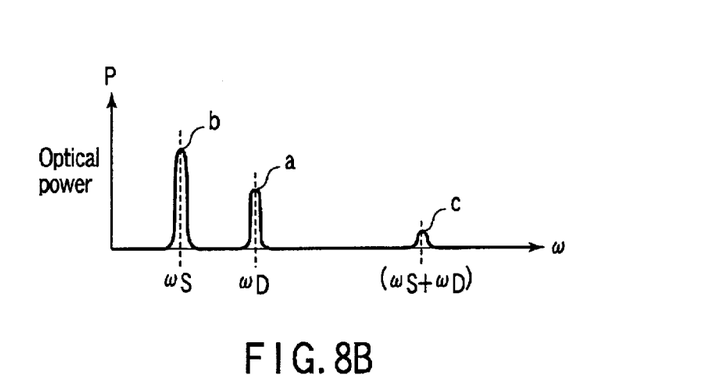

If the measuring object light "a" having an angular frequency $\omega_D$ and the sampling light "b" having an angular frequency $\omega_S$ are entered into one face of the nonlinear optical material 1 such that the polarization directions thereof are perpendicular to each other as shown in FIG. 8A, in a condition that the nonlinear optical material 1 allows the type 2 phase matching to two lights "a" and "b", the sum frequency light "c" having a sum angular frequency ($\omega_S + \omega_D$) is outputted from the other face of the nonlinear optical material 1.

The phase matching refers to it that the velocity (phase velocity) of each incident light entered into the nonlinear optical material 1 and the velocity of harmonic light to the incident light like the sum frequency light excited by the incident light coincide with each other in the crystal of the nonlinear optical material 1.

Then, the type 2 phase matching refers to phase matching which is executed when the polarization directions of two incident lights are perpendicular to each other.

Meanwhile, the type 1 phase matching refers to phase matching which is executed when the polarization directions of two incident lights agree with each other.

The velocity of light advancing within the nonlinear optical material 1 differs depending upon the wavelength (frequency) and the advance direction to a crystalline axis.

Thus, for the velocity (phase velocity) of each incident light described above within the crystal and the velocity (phase velocity) of the sum frequency light within the crystal to coincide with each other, when the direction connecting an intersection between a refractivity ellipsoid of the incident light and a refractivity ellipsoid of the sum frequency light within the three-dimensional coordinates of the crystal is regarded as phase matching direction, the optical axis of each incident light described above is matched with the phase matching direction.

Further, the polarization direction of each incident light only has to be parallel to or perpendicular to the reference axis of a crystal existing within a plane at right angle to the phase matching direction.

More specifically, the nonlinear optical material 1 is cut out in the form of a rectangular pipe or cylinder having a plane perpendicular to that phase matching direction.

Currently, as such a nonlinear optical material 1, KTP ($KH_2PO_4$), LN ($LiNbO_3$), LT ($LiTaO_3$), KN ($KNbO_3$) and the like are available.

Figure 9:
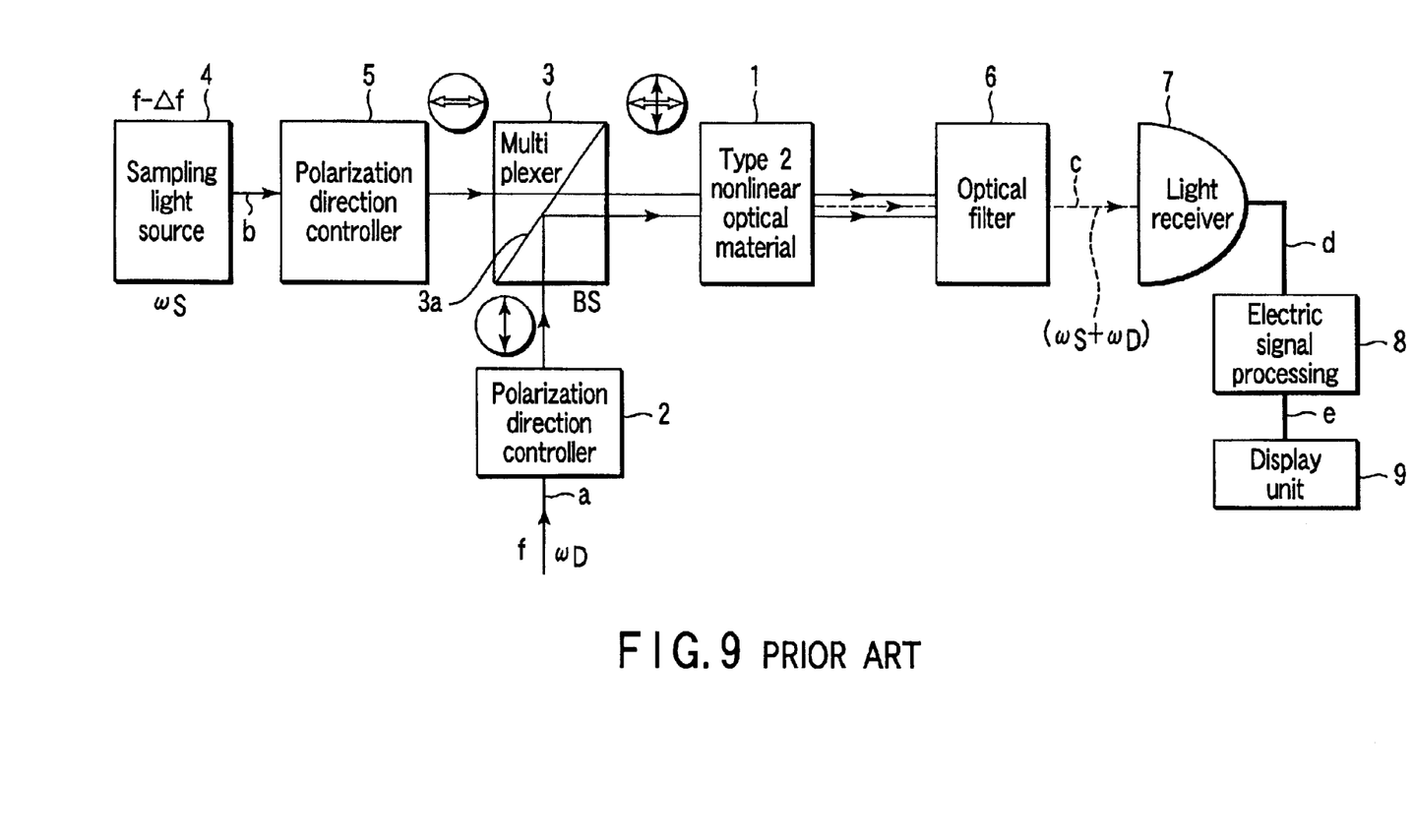
FIG. 9 is a block diagram showing a schematic structure of a conventional optical sampling waveform measuring apparatus.

FIG. 9 is a block diagram showing the schematic structure of a conventional optical sampling waveform measuring apparatus including the nonlinear optical material 1 allowing the type 2 phase matching.

The measuring object light "a" having the repetition frequency "f" of a pulse waveform under the angular frequency $\omega_D$ of light entered from outside is controlled in terms of its polarization direction to 90° with respect to the reference direction (0° direction) by a polarization direction controller 2 and after that, entered into a multiplexer 3.

On the other hand, a sampling light source 4 outputs the sampling light "b" having the repetition frequency (f−Δf) of a pulse waveform under the angular frequency $\omega_S$ different from the angular frequency $\omega_D$ of the aforementioned measuring object light "a".

As shown in FIG. 7B, the pulse width of this sampling light "b" is set by far narrower than the pulse width of the measuring object light "a".

After the polarization direction is controlled to for example, the reference direction (0° direction) by means of a polarization direction controller 5, the sampling light "b" outputted from the sampling light source 4 is entered into the multiplexer 3.

The multiplexer 3 comprised of for example, a beam splitter (BS) allows the incident light to advance straight through a half mirror 3a and reflects it at right angle.

Therefore, the sampling light "b" having a polarization direction, which is the reference direction (0° direction) and the measuring object light "a" having a polarization direction which is at 90° with respect to the reference direction (0° direction) are entered into one face of the nonlinear optical material 1 which allows type 2 phase matching, disposed behind this multiplexer 3 and located on the optical axis of the sampling light "b" at the same time.

Consequently, a sum frequency light "c" having an angular frequency ($\omega_S + \omega_D$) is outputted from the other face of the nonlinear optical material 1 of type 2.

The sum frequency light "c" outputted from the nonlinear optical material 1 is entered into a light receiver 7 through an optical filter 6.

Light outputted from the nonlinear optical material 1 contains light (sum frequency light "c") having the sum angular frequency ($\omega_S$, $\omega_D$) of the frequencies $\omega_S$ and $\omega_D$ of the aforementioned two lights "a" and "b", lights having angular frequencies $2\omega_S$ and $2\omega_D$ which are twice the respective angular frequencies $\omega_S$ and $\omega_D$ although minute, and lights having the respective angular frequencies $\omega_S$ and $\omega_D$ which are not converted. Therefore, the components having these is angular frequencies $2\omega_S$, $2\omega_D$, $\omega_S$ and $\omega_D$ with the optical filter 6.

Then, the light receiver 7 converts the sum frequency light "c" to the electric signal "d" and transmits it to an electric signal processing system 8 on a next stage.

This electric signal processing system 8 creates an optical pulse "e" of the measuring object light "a" enlarged in time direction according to the above-described method from an electric signal "d" having the same waveform as the entered sum frequency light "c" shown in FIG. 7C and displays it on a display unit 9.

However, the conventional optical sampling waveform measuring apparatus shown in FIG. 9 has a following problem to be solved.

In order to improve the measuring accuracy of the optical pulse "e" in the optical sampling waveform measuring apparatus for measuring the optical pulse waveform "e" of the measuring object light using the sum frequency light "c" generated from the aforementioned nonlinear optical material 1, it is necessary to improve generation efficiency of the sum frequency light "c" generated from the nonlinear optical material 1 so as to improve the S/N ratio of the sum frequency light "c".

More specifically, if the intensity of the sum frequency light "c" is assumed to be $P_{SFG}$ and the intensities of the measuring object light "a" and the sampling light "b" are assumed to be $P_{SIG}$, $P_{SAM}$, the intensity $P_{SFG}$ of the sum frequency light "c" is expressed with a following expression:

$$P_{SFG} = \eta \cdot R_{SIG} \cdot P_{SAM}$$

where $\eta$ is a nonlinear conversion efficiency constant which is automatically determined depending on the kind and material of the nonlinear optical material 1 to be adopted.

As the nonlinear optical material 1 having a high nonlinear conversion efficiency constant $\eta$, KTP, LN, KN and the like, which are the aforementioned inorganic nonlinear optical material 1, are employed.

However, to measure the optical pulse waveform within a single repetition cycle of the measuring object light having a repetition frequency of about several tens GHz, the S/N ratio of the sum frequency light needs to be 3 dB or more.

Thus, development of the nonlinear optical material 1 having a high nonlinear conversion efficiency constant $\eta$ has been demanded.

As the nonlinear optical material which satisfies these demands, Jpn. Pat. Appln. KOKAI Publication No. 9-159536 has disclosed an optical sampling waveform measuring apparatus employing 2-adamantyl-5-nitropyridine (hereinafter referred to as AANP) which is not inorganic but organic nonlinear optical crystal.

Here, the nonlinear conversion efficiency constant $\eta$ of the AANP, which is an organic nonlinear optical crystal, is on the order of $10^{-2}$ which is by far higher than the nonlinear conversion efficiency constant $\eta$ on the order of $10^{-4}$ of KTP, LN, LT, KN and the like which are the aforementioned inorganic nonlinear optical materials.

Therefore, if the AANP which is an organic nonlinear optical crystal is employed for the optical sampling waveform measuring apparatus as the nonlinear optical material, the S/N ratio of the sum frequency light emitted from this AANP is improved, so that finally, the measuring accuracy for the optical pulse waveform is also improved.

However, even the optical sampling waveform measuring apparatus employing the AANP nonlinear optical crystal still has a following problem, which should be solved.

That is, a main measuring object light, which is subject to measurement with the optical sampling waveform measuring apparatus, is optical signal in an optical communication system.

Currently, the optical communication system has begun to use not only C band (1530 to 1565 nm) but also L band (1570 to 1610 nm) in order to aim at increase of transmission capacity.

Thus, a necessity of measuring optical signals in such a wavelength range of C band and L band occurs in the optical sampling waveform measuring apparatus also.

The AANP nonlinear optical crystal has such a problem that although its nonlinear conversion efficiency is high as described above, according to the conventional technology, the 3 dB band capable of generating the SFG light is about 40 nm, which is 1535 to 1575 nm (reported in ECOC '96 ThB, 1.2) while no SFG light can be obtained in a wide band of 80 nm including the L band.

This reason is that if the measuring object wavelength changes from its initial condition even if the sampling wavelength is fixed, inconsistency in phase matching occurs rapidly so that the efficiency of conversion of the measuring object light and sampling light to the sum frequency light drops.

Because actually, the optical sampling waveform measuring apparatus defines the amplitude of a measurement value by the measuring object wavelength to be 3 dB, the measuring band based on the prior art is limited to 40 nm.

For the reason, if it is intended to measure a measuring object light in a band of 40 nm or more, it is necessary to prepare a multiplicity of the AANP nonlinear optical crystals corresponding to the band of the measuring object wavelength.

Further, the wavelength of the sampling pulse in the optical sampling waveform measuring apparatus needs to be switched between the C band and the L band.

For example, inconveniently, when measuring the C band, the sampling pulse wavelength is set to 1555 nm and when measuring the L band, it is set to 1590 nm and then, sampling is carried out through the AANP nonlinear optical crystal cut out corresponding to each wavelength.

Therefore, if it is intended to measure the C band and the L band, at least two optical sampling waveform measuring apparatuses need to be prepared corresponding to each band, which provides an important problem from viewpoint of cost performance.

BRIEF SUMMARY OF THE INVENTION

The present invention has been achieved in views of the above-described problems and therefore, an object of the invention is to provide an optical sampling waveform measuring apparatus in which by applying a specific phase matching condition to the AANP which is a nonlinear optical crystal for generating a sum frequency light of the sampling light and the measuring object light, the 3 dB band width of the sum frequency light generation efficiency is increased twice or more so as to possess a measuring object band of 80 nm or more thereby achieving a wider band.

To achieve the above described object, according to a first aspect of the present invention, there is provided an optical sampling waveform measuring apparatus comprising:

a sampling light source (4) which emits a sampling light (b) having a single polarization direction whose pulse width is smaller than that of an inputted measuring object light (a) having a single polarization direction;

a multiplexer (3) which multiplexes the sampling light emitted from the sampling light source and the measuring object light on the same optical axis such that the polarization directions thereof are perpendicular to each other;

a nonlinear optical crystal (10) composed of 2-adamantyl-5-nitorpyridine (AANP) allowing type 2 phase matching to the sampling light and the measuring object light, which, when the sampling light and the measuring object light multiplexed by the multiplexer are entered, emits a sum frequency light (c) of the sampling light and the measuring object light, the sum frequency light having a sum angular frequency $\omega_D+\omega_S$, based on the measuring object light having an angular frequency $\omega_D$ and the sampling light having an angular frequency $\omega_S$, with the polarization directions thereof being perpendicular to each other;

a light receiver (7) which converts the sum frequency light outputted from the nonlinear optical crystal to an electric signal (d);

a signal processing portion (8) which processes the electric signal outputted from the light receiver so as to display an optical pulse waveform (e) of the measuring object light; and control means (2, 5) for, when the sum frequency light (c) of the sampling light and the measuring object light is emitted from the nonlinear optical crystal, controlling the polarization direction of the sampling light so as to be parallel to a predetermined reference axis located within a plane perpendicular to a phase matching direction (15) of the nonlinear optical crystal, wherein the predetermined reference axis is a single axis maintaining parallelism with the crystalline axis of the nonlinear optical crystal even if the wavelength of inputted light is changed.

According to a second aspect of the present invention, there is provided an optical sampling waveform measuring apparatus according to the first aspect, wherein the sampling light source is capable of emitting plural sampling lights each having a different wavelength and any one of the plural sampling lights is selected and emitted.

According to a third aspect of the present invention, there is provided an optical sampling waveform measuring apparatus comprising:

a sampling light source (4) which emits a sampling light (b) having a single polarization direction whose pulse width is smaller than that of an inputted measuring object light (a) having a single polarization direction;

a multiplexer (3) which multiplexes the sampling light emitted from the sampling light source and the measuring object light on the same optical axis such that the polarization directions thereof are perpendicular to each other;

a nonlinear optical crystal (10) composed of 2-adamantyl-5-nitorpyridine (AANP) allowing type 2 phase matching to the sampling light and the measuring object light, which, when the sampling light and the measuring object light multiplexed by the multiplexer are entered, emits a sum frequency light (c) of the sampling light and the measuring object light, the sum frequency light having a sum angular frequency $\omega_D+\omega_S$, based on the measuring object light having an angular frequency $\omega_D$ and the sampling light having an angular frequency $\omega_S$, with the polarization directions thereof being perpendicular to each other;

incident angle changing means (30) for changing an incident angle of each of the sampling light and measuring object light to be entered into the nonlinear optical crystal into the nonlinear optical crystal;

a light receiver (7) which converts the sum frequency light outputted from the nonlinear optical crystal to an electric signal (d);

a signal processing portion (8) which processes the electric signal outputted from the light receiver so as to display an optical pulse waveform (e) of the measuring object light; and control means (2, 5) for, when the sum frequency light (c) of the sampling light and the measuring object light is emitted from the nonlinear optical crystal, controlling the polarization direction of the sampling light so as to be parallel to a predetermined reference axis located within a plane perpendicular to a phase matching direction (15) of the nonlinear optical crystal, wherein the predetermined reference axis is a single axis maintaining parallelism with the crystalline axis of the nonlinear optical crystal even if the wavelength of inputted light is changed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Reference will now be made in detail to the presently preferred embodiments of the invention as illustrated in the accompanying drawings, in which like reference numerals designate like or corresponding parts.

Hereinafter, an outline of the present invention will be described below.

In an optical sampling waveform measuring apparatus of the present invention, organic nonlinear optical crystalline AANP is employed as a nonlinear optical crystal and a specific phase matching condition is applied thereto in order to generate a sum frequency light, so that the S/N of the sum frequency light emitted from the AANP of this organic nonlinear optical crystal is improved thereby improving measuring accuracy of an optical waveform of a measuring object light.

As condition for generating the sum frequency light by type 2 phase matching for the measuring object light and sampling light, an optical axis of each of the measuring object light and sampling light which are multiplexed so that the polarization directions thereof intersect each other is matched with the phase matching direction of the AANP which is an organic nonlinear optical crystal and the polarization direction of each of the measuring object light and the sampling light is made parallel to or perpendicular to a predetermined reference axis located within a plane perpendicular to the phase matching direction of the AANP.

The predetermined reference axis is a single axis maintaining parallelism with the crystalline axis of the nonlinear optical crystal even if the wavelength of inputted light is changed.

In this case, if with the incident angle (incident direction) of each of the measuring object light and the sampling light to the AANP so as to fix the wavelength of the sampling light, the wavelength of the measuring object light is changed, the phase matching direction is changed, so that phase matching is disabled.

From this, it can be easily imagined that the measuring accuracy of the optical waveform drops corresponding to a change amount of an angle in the phase matching direction.

Therefore, it is desirable that there is a smaller change in the phase matching direction even if the wavelength of the measuring object light is changed.

As described above, the polarization direction of each of the measuring object light and the sampling light is made parallel to or perpendicular to a predetermined reference axis located within a plane perpendicular to the phase matching direction of the AANP. It has been made evident that there occurs a difference in the change amount of the phase matching direction in the AANP depending upon the polarization direction of which light is made perpendicular to the predetermined reference axis.

Figure 6:
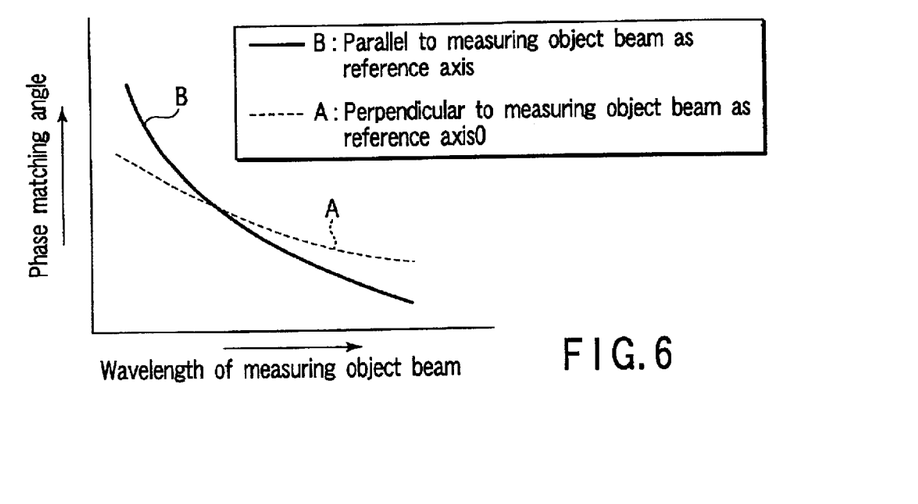
FIG. 6 is a diagram showing a relation between the wavelength of a measuring object light and phase matching angle in the optical sampling waveform measuring apparatus of FIG. 1.

FIG. 6 shows an example of this.

The characteristic A in FIG. 6 indicates a change in the phase matching angle when the wavelength of the measuring object light is changed, with the polarization direction of the measuring object light set perpendicular to the reference axis (axis "a" in this example) of the AANP crystal and polarization direction of the sampling light set parallel to the reference axis of the AANP crystal while the wavelength of the sampling light fixed.

Conversely, the characteristic B in FIG. 6 indicates a change in the phase matching angle when the wavelength of the measuring object light is changed, with the polarization direction of the measuring object light set parallel to the reference axis of the AANP crystal and the polarization direction of the sampling light set perpendicular to the reference axis of the AANP crystal while the wavelength of the sampling light fixed.

As indicated by the characteristic A in FIG. 6, when the polarization direction of the measuring object light is set perpendicular to the reference axis of the AANP crystal while the polarization direction of the sampling light is set parallel to the reference axis of the AANP crystal, it is easily understood that the change rate of the phase matching direction to a change in the wavelength of the measuring object light is smaller so that a measured optical waveform is unlikely to be affected by the variation in the wavelength of the measuring object light.

Therefore, according to the present invention, the polarization direction of the measuring object light is set perpendicular to the reference axis of the AANP crystal, while the polarization direction of the sampling light is set parallel to the reference axis of the AANP crystal.

Such setting condition enables to maintain necessary generation efficiency in a wider range even if the wavelength of the measuring object light is changed.

The setting condition is contrary to the setting considered as optimum conventionally.

In the meantime, the computation method and experimental data about the output of the second harmonic generation (SHG) light due to a deviation in angle from the phase matching angle are well known regarding the nonlinear optical crystal.

Figure 12:
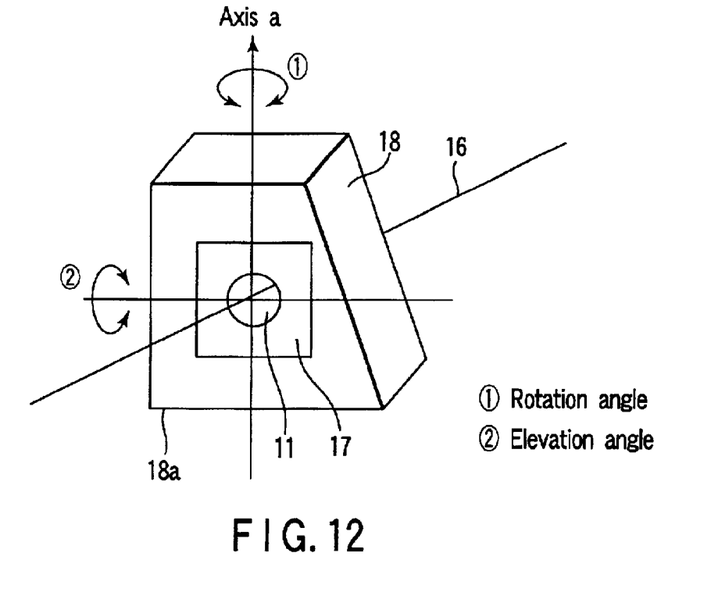
FIG. 12 is a diagram for explaining an incident angle of a nonlinear optical crystal.
Figure 13:
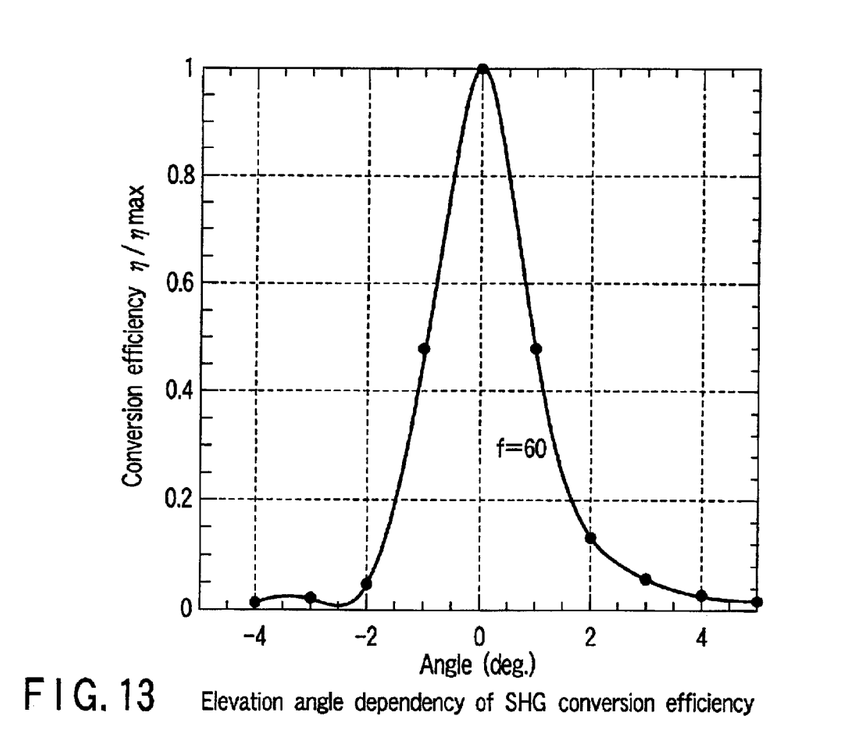
FIG. 13 is a diagram showing rotation angle dependency of SHG conversion efficiency.
Figure 14:
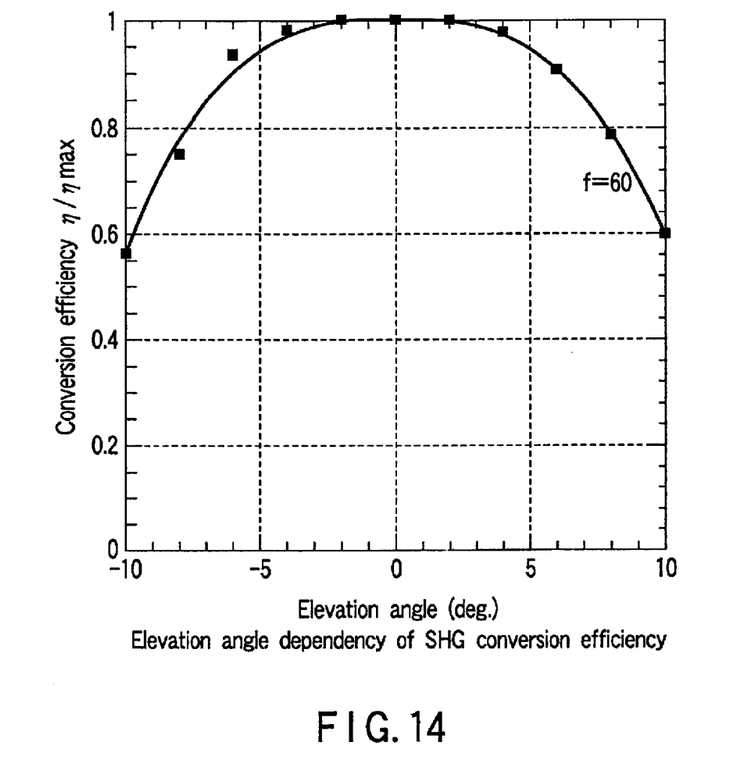
FIG. 14 is a diagram showing elevation angle dependency of the SHG conversion efficiency.

For example, in case of the AANP, if the change in the output of the SHG light shown in FIG. 13 due to an angle deviation (rotation angle) from the phase matching angle around the axis "a" as shown in FIG. 12 is compared with the change in the output of the SHG light shown in FIG. 14 due to the angle deviation (elevation angle) from the phase matching angle around an axis perpendicular to the axis "a", apparently, the change rate of the latter (FIG. 14) is smaller than the change rate of the former (FIG. 13).

In other words, it is evident that the SHG light is sensitive to the angle deviation around the axis "a" and its generation amount changes insensitively to the angle deviation around the axis perpendicular the axis "a".

Thus, in an optical system using the nonlinear optical crystal allowing type 2 phase matching without changing the relation in position of its optical components, the wavelength of a fixed wavelength light is not changed. Consequently, there is no changed in the optical axis due to aberration and dispersion of the optical components. Therefore, the polarization direction is set perpendicular to the axis "a".

Because the optical axis of the other light whose wavelength is changed due to aberration or dispersion of the optical component, its polarization direction is set parallel to the axis "a".

In the conventional optical sampling waveform measuring apparatus shown in FIG. 9, the measuring object light "a" is inputted as light whose wavelength is changed and the sampling light "b" is inputted as light whose wavelength is not changed.

Figure 10:
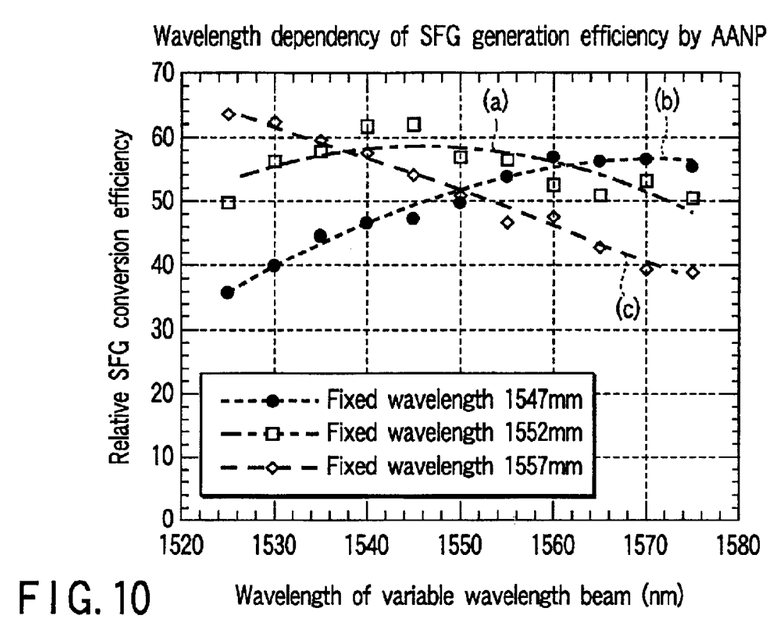
FIG. 10 is a diagram showing waveform dependency characteristic of SFG generation efficiency by the AANP incorporated in the optical sampling waveform measuring apparatus of FIG. 1.

FIG. 10 is a diagram showing a result of experiment conducted employing the aforementioned setting condition.

Although the nonlinear optical crystal is cut out perpendicular to the phase matching direction of light whose wavelength is scheduled to be used as described above, FIG. 10 shows a result of a case where light whose wavelength is different from the wavelength scheduled to be used is entered as fixed wavelength light (sampling light).

In FIG. 10, its abscissa axis indicates the wavelength (nm) of the variable wavelength light (measuring object light) while its ordinate axis indicates relative SFG conversion efficiency.

More specifically, FIG. 10 shows conversion efficiency relative to the wavelength of the variable wavelength light when the wavelength of the fixed wavelength light is 1547 nm (characteristic (b) in FIG. 10), 1552 nm (characteristic (a) in FIG. 10), 1557 nm (characteristic (c) in FIG. 10) in the optical system in which the first light a and the second light b are disposed such that their optical axes coincide with this phase matching direction in the AANP crystal cut out perpendicular to the phase matching direction to light whose wavelength is 1552 nm.

From FIG. 10, it is evident that when the phase matching direction of the aforementioned AANP crystal coincides with the phase matching direction relative to the wavelength of fixed wavelength light (that is, the wavelength of the fixed wavelength light is 1552 nm, which is scheduled to be used), the band width in which the sum frequency light is generated is about 80 nm under the width of 3 dB.

In this case, as indicated by the characteristic (a) of FIG. 10, a portion having a high conversion efficiency appears with the wavelength of the variable wavelength light being at peak of 1552 nm.

However, if the fixed wavelength light having the wavelength of 1547 nm is entered, the peak of the conversion efficiency is shifted to the side of a longer wavelength as indicated by the characteristic (b) in FIG. 10.

On the other hand, if the fixed wavelength light having the wavelength of 1557 nm is entered, the peak of the conversion efficiency is shifted to the side of a shorter wavelength as indicated by the characteristic (c) in FIG. 10.

From these matters, it is evident that in the same optical system employing the same AANP crystal, the wavelength range (band) of the variable wavelength light (measuring object light) capable of obtaining necessary sum frequency light generation efficiency can be shifted by changing the wavelength of the fixed wavelength light.

Figure 11:
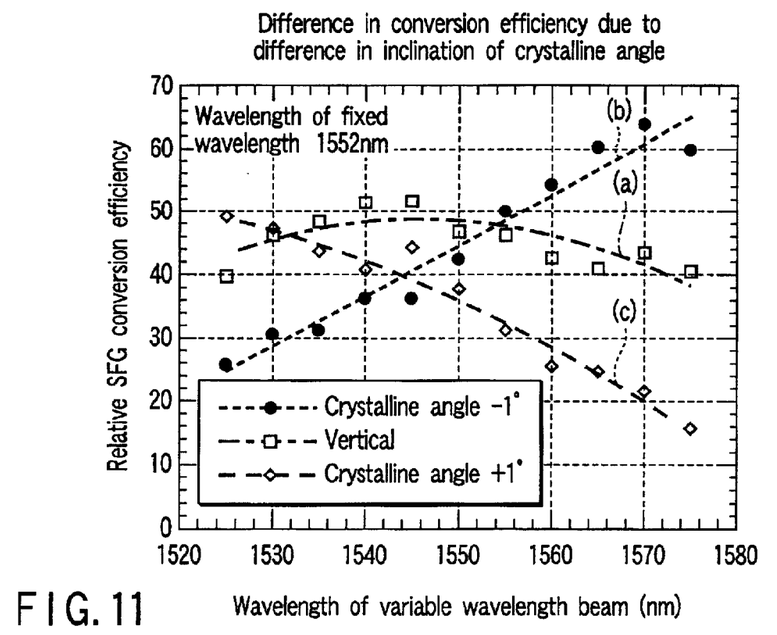
FIG. 11 is a diagram showing a difference in conversion efficiency due to a difference in the inclination of the crystalline angle due to the AANP incorporated in the optical sampling waveform measuring apparatus of FIG. 1.

FIG. 11 is a diagram showing conversion efficiency of the wavelength of the variable wavelength light in case where an angular shift around the axis "a" between the phase matching direction and the optical axis is −1° (characteristic (b) in FIG. 11), 0° (characteristic (a) in FIG. 11) and +1° (characteristic (c) in FIG. 11), in an optical system capable of shifting the direction of the optical axis of light obtained by multiplexing the fixed wavelength light with the variable wavelength light from the phase matching direction, when the wavelength of the fixed wavelength light is 1552 nm relative to the AANP crystal cut out perpendicular to the phase matching direction corresponding to the light having the wavelength of 1552 nm.

In this case, the setting condition is the same as in FIG. 10, in which the polarization direction of the fixed wavelength light is set parallel to the reference axis (axis "a" in this case) of the AANP crystal.

As evident from FIG. 11, in case where the phase matching direction coincides with the direction of the optical axis, a portion having a high conversion efficiency appears with the wavelength of the variable wavelength light being at peak of 1552 nm as indicated by the characteristic (a) of FIG. 11.

However, if the angle is shifted by −1°, the peak of the conversion efficiency is shifted to the side of a longer wavelength as indicated by the characteristic (b) in FIG. 11.

On the other hand, if the angle is shifted by +1°, the peak of the conversion efficiency is shifted to the side of a shorter wavelength as indicated by the characteristic (c) in FIG. 11.

These matters indicate that in the same optical system using the same AANP crystal, the wavelength range (band) of the variable length light (measuring object light) capable of obtaining necessary sum frequency light generation efficiency can be shifted by changing the incident angle of light.

In the present invention, basically, if with respect to an AANP nonlinear optical crystal having a plane perpendicular to the phase matching direction relative to the fixed wavelength of the sampling light, for example, the axis "a" located within that plane is regarded as the reference axis, the polarization direction of the measuring object light is set at right angle to the reference axis (axis "a") of the crystal while the polarization direction of the sampling light is set parallel to the reference axis (axis "a") of the crystal.

However, substantially, if the polarization direction of the measuring object light is set at right angle to the reference axis located within the plane perpendicular to the phase matching direction of a cut out crystal while the polarization direction of the sampling light is set parallel to the reference axis, the characteristic A in FIG. 6 is obtained, thereby making it possible to realize phase matching in a wider band.

That is, because the band for use in the optical sampling waveform measuring apparatus can be widened, it is possible to achieve an optical sampling waveform measuring apparatus having a measuring band of 80 nm or more.

Next, the embodiments of the present invention based on the above-described outline will be described with reference to the accompanying drawings.

(First Embodiment)

Figure 1:
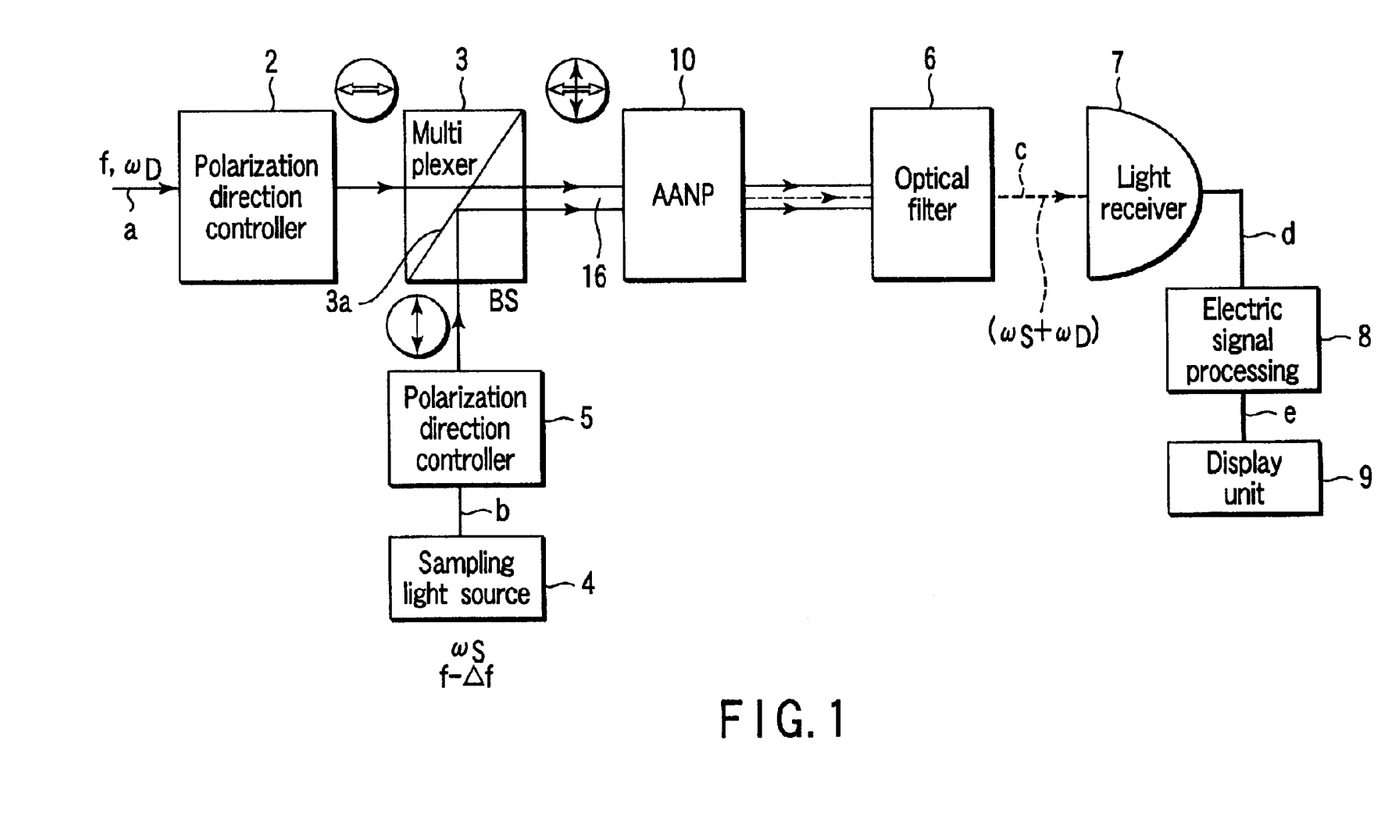
FIG. 1 is a block diagram showing a schematic structure of an optical sampling waveform measuring apparatus according to an embodiment of the present invention.

FIG. 1 is a block diagram showing a schematic structure of an optical sampling waveform measuring apparatus according to a first embodiment of the present invention.

In FIG. 1, like reference numerals are attached to the same components as a conventional optical sampling waveform measuring apparatus shown in FIG. 9 and a detail description of duplicated portions is omitted.

The optical sampling waveform measuring apparatus of this embodiment includes an AANP 10 which is an organic nonlinear optical crystal instead of an inorganic nonlinear optical material 1 such as KTP, LN, LT, KN and the like allowing type 2 phase matching in the conventional optical sampling waveform measuring apparatus shown in FIG. 9.

Figures 2, 3:
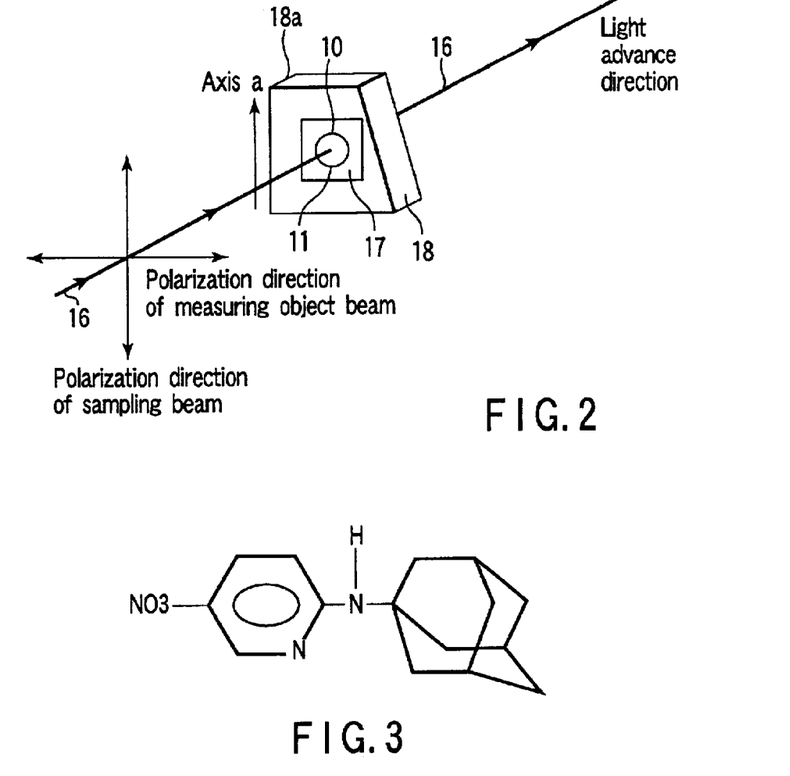
FIG. 2 is a schematic diagram showing a major structure of the optical sampling waveform measuring apparatus of FIG. 1.
FIG. 3 is a diagram showing a molecular structure of AANP incorporated in the optical sampling waveform measuring apparatus of FIG. 1.
Figure 4:
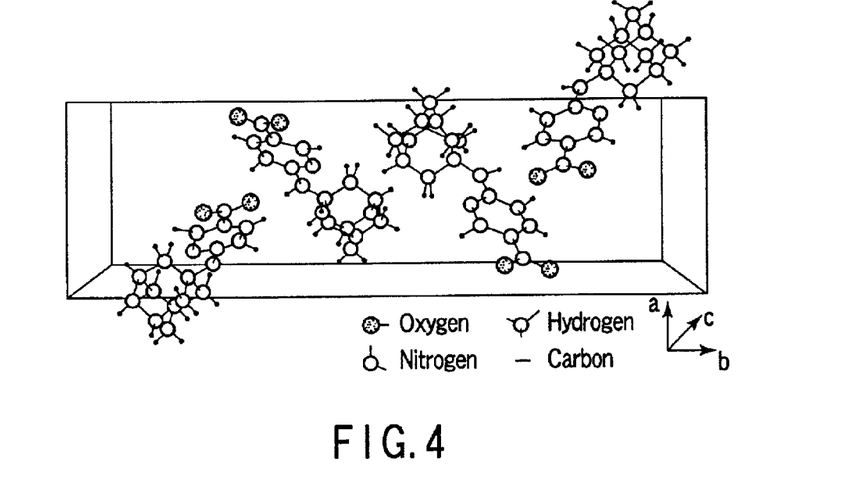
FIG. 4 is a diagram showing a crystalline structure of the AANP incorporated in the optical sampling waveform measuring apparatus of FIG. 1.

This AANP 10 has a molecular structure shown in FIG. 3 and a crystalline structure shown in FIG. 4.

In the crystalline structure shown in FIG. 4, the axis "a" indicates a reference axis while axes "b" and "c" intersect the axis "a".

Figure 5A:
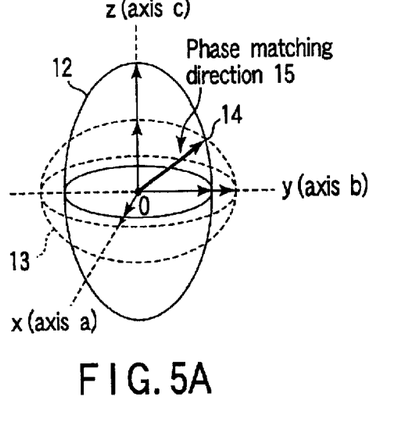
FIGS. 5A and 5B are diagrams showing a procedure for obtaining a phase matching direction in the AANP incorporated in the optical sampling waveform measuring apparatus of FIG. 1.

A method for determining the phase matching direction in the AANP 10 which is an organic nonlinear optical crystal will be described with reference to FIGS. 5A and 5B.

As described above, the direction connecting an intersection 14 between a refractivity ellipsoid 12 of a sampling light "b" and refractivity ellipsoid 13 of a sum frequency light "c" with the coordinate home position is regarded as a phase matching direction 15 and the optical axis of the incident light (measuring object light "a", sampling light "b") is matched with the phase matching direction 15 within refractivity three-dimensional coordinate of xyz (abc) in the crystal.

Figure 5B:
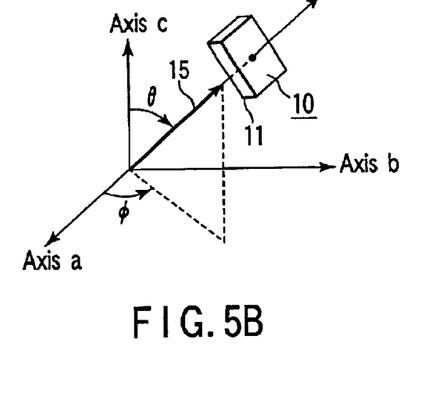

More specifically, as shown in FIG. 5B, a rectangular pipe or cylinder cut out from a large material (block) of the AANP which is an organic nonlinear optical crystal, such that it has a plane 11 perpendicular to the phase matching direction 15 is employed as the AANP 10.

A rectangular pipe like or cylindrical AANP 10 having the plane 11 perpendicular to the phase matching direction 15, cut out from the large material (block) is supported with a supporting frame 18 made of epoxy resin through an AR coating glass 17 as shown in FIG. 2.

The posture angle of the rectangular pipe like or cylindrical AANP 10 is set up such that the axis "a" which is a reference axis of the AANP 10 crystal, projected to the plane 11 intersecting the phase matching direction 15 is parallel to a side 18a.

A single optical axis 16 of the measuring object light "a" and the sampling light "b" multiplexed such that the polarization directions thereof intersect each other with a multiplexer 3 is set up so as to be perpendicular to the plane 11 of the AANP 10 intersecting the phase matching direction 15.

In this case, the polarization direction of the measuring object light "a" is set up at right angle to the axis "a" which is the reference axis of the AANP 10 crystal as shown in FIG. 2.

As a result, the polarization direction of the sampling light "b" is set up parallel to the axis "a" which is the reference axis of the AANP 10 crystal.

About the sampling waveform measuring apparatus of this embodiment, a case where the phase matching angle φ is 90° will be described.

In this case, although the axis "a", which is the reference axis of the AANP 10 crystal, serves as the reference axis, the phase matching angle θ may be sometimes 90° depending on the wavelength of light to be entered and when the phase matching angle θ is 90°, the axis c of the AANP 10 crystal serves as the reference axis.

In the optical sampling waveform measuring apparatus having such a structure, a measuring object light "a" having a repeated frequency "f" of a pulse waveform with an angular frequency $\omega_D$ of light entered from outside is controlled with a polarization direction controller 2 so that its polarization direction is along the reference direction (0° direction) and after that, entered into the multiplexer 3.

On the other hand, a sampling light source 4 outputs the sampling light "b" having the repetition frequency (f−Δf) of a pulse waveform with an angular frequency $\omega_S$.

The sampling light "b" outputted from this sampling light source 4 is controlled to 90° relative to the reference direction (0° direction) in terms of its polarization direction by the polarization direction controller 5 and after that, entered into the multiplexer 3.

Here, the multiplexer 3 incorporated in a half mirror 3a allows the measuring object light "a" to advance and simultaneously reflects the sampling light "b" at right angle.

Therefore, the measuring object light "a" and the sampling light "b" emitted from this multiplexer 3 intersect each other in their polarization directions and are multiplexed through a single optical axis 16.

Light obtained by multiplexing the measuring object light "a" and the sampling light "b" emitted from the multiplexer 3 is entered into the plane (incident face) 11 of the AANP 10, which is an organic nonlinear optical crystal allowing type 2 phase matching disposed on the optical axis 16.

The condition in which the measuring object light "a" and the sampling light "b" are incident to the AANP 10 is the same as described with FIG. 2.

Therefore, the sum frequency light "c" having an angular frequency $(\omega_S+\omega_D)$ which is a sum of an angular frequency $\omega_S$ of the measuring object light "a" and an angular frequency $\omega_D$ of the sampling light "b", is outputted from the other face of the AANP 10, which is the organic nonlinear optical crystal allowing the type 2 phase matching.

The sum frequency light "c" outputted from the AANP 10 in this way is entered into a light receiver 7 through an optical filter 6.

This light receiver 7 converts the sum frequency light "c" to an electric signal "d" and transmits it to an electric signal processing system 8 on a next stage.

This electric signal processing system 8 creates the optical pulse waveform "e" of the measuring object light "a" enlarged in the time axis direction from an electric signal "d"

having the same waveform as the inputted sum frequency light "c" shown in FIG. 7C according to the aforementioned method and outputs it to a display unit 9 so that it is displayed.

As described above, a nonlinear conversion efficiency constant η of the AANP 10 which is the organic nonlinear optical crystal used in this sampling waveform measuring apparatus is by far higher than a nonlinear conversion efficiency constant η of an inorganic nonlinear optical material.

Therefore, such a sampling waveform measuring apparatus is capable of improving the S/N ratio of the sum frequency light "c" emitted from the AANP 10 which is the organic nonlinear optical crystal thereby improving the measuring accuracy of the optical pulse "e" to be finally outputted to and displayed on the display unit 9.

Further, this sampling waveform measuring apparatus matches the optical axes 16 of the measuring object light "a" and the sampling light "b" multiplexed such that the polarization directions thereof intersect each other with the phase matching direction 15 of the AANP 10 as a condition for the AANP 10 to maintain the type 2 phase matching to the measuring object light "a" and the sampling light "b", and sets the polarization direction of the measuring object light "a" whose wavelength changes depending upon a measuring object at right angle to the reference axis of the AANP 10 crystal (axis "a" in this embodiment) while setting the sampling light "b" which is a fixed wavelength parallel to the reference axis of the crystal, in order to widen the measuring object wavelength band.

According to this sampling waveform measuring apparatus, as shown in FIG. 6, if the polarization direction of the measuring object light "a" indicated by the characteristic A is set at right angle to the reference axis of the AANP 10 crystal while the polarization direction of the sampling light "b" is set parallel to the reference axis of the crystal, the change rate of the phase matching direction 15 relative to a change in the wavelength of the measuring object light "a" is smaller as compared to a case where the polarization direction of the measuring object light "a" indicated by the characteristic B is set parallel to the reference axis of the crystal. Consequently, this sampling waveform measuring apparatus can suppress the wavelength dependency of an optical sampling oscilloscope to as low as 80 nm.

(Second Embodiment)

Figure 15:
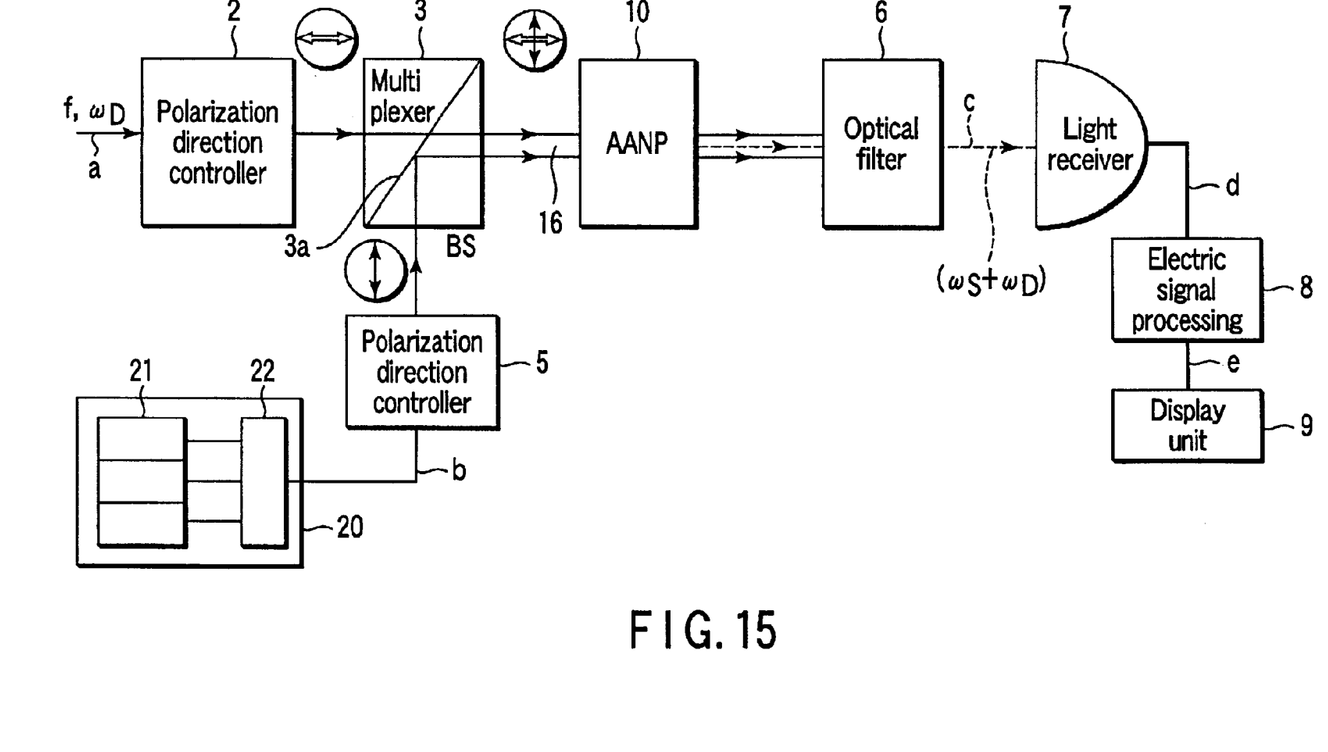
FIG. 15 is a block diagram showing a schematic structure of an optical sampling waveform measuring apparatus according to a second embodiment of the present invention.

FIG. 15 is a block diagram showing a schematic structure of an optical sampling waveform measuring apparatus according to a second embodiment of the present invention.

In FIG. 15, like reference numerals are attached to the same components as the optical sampling waveform measuring apparatus shown in FIG. 1 and a detailed description of duplicated portion is omitted.

This optical sampling waveform measuring apparatus shown in FIG. 15 is different from the optical sampling waveform measuring apparatus shown in FIG. 1 in that in FIG. 15, by using a sampling light source 20 comprised of a multi-wavelength light source 21 capable of emitting lights of multiple wavelengths and an optical path switching device 22 selectively emitting one of the lights of the multiple wavelengths, it is capable of changing the wavelength of the sampling light "b" instead of the sampling light source 4 emitting light of a single wavelength shown in FIG. 1.

In this case, it is permissible to employ a variable wavelength sampling light source capable of changing the wavelength so that the sampling light "b" is emitted to a fixed point within the variable wavelength range while the one point is selectable from plural points so as to change the wavelength of the sampling light "b".

By changing the wavelength of the sampling light "b" to for example, 1547 nm, 1552 nm or 1557 nm using the sampling light source 20, it is possible to realize an optical sampling waveform measuring apparatus capable of corresponding to a measuring object light "a" of a wider band than that of a single wavelength as shown in FIG. 10.

(Third Embodiment)

Figure 16:
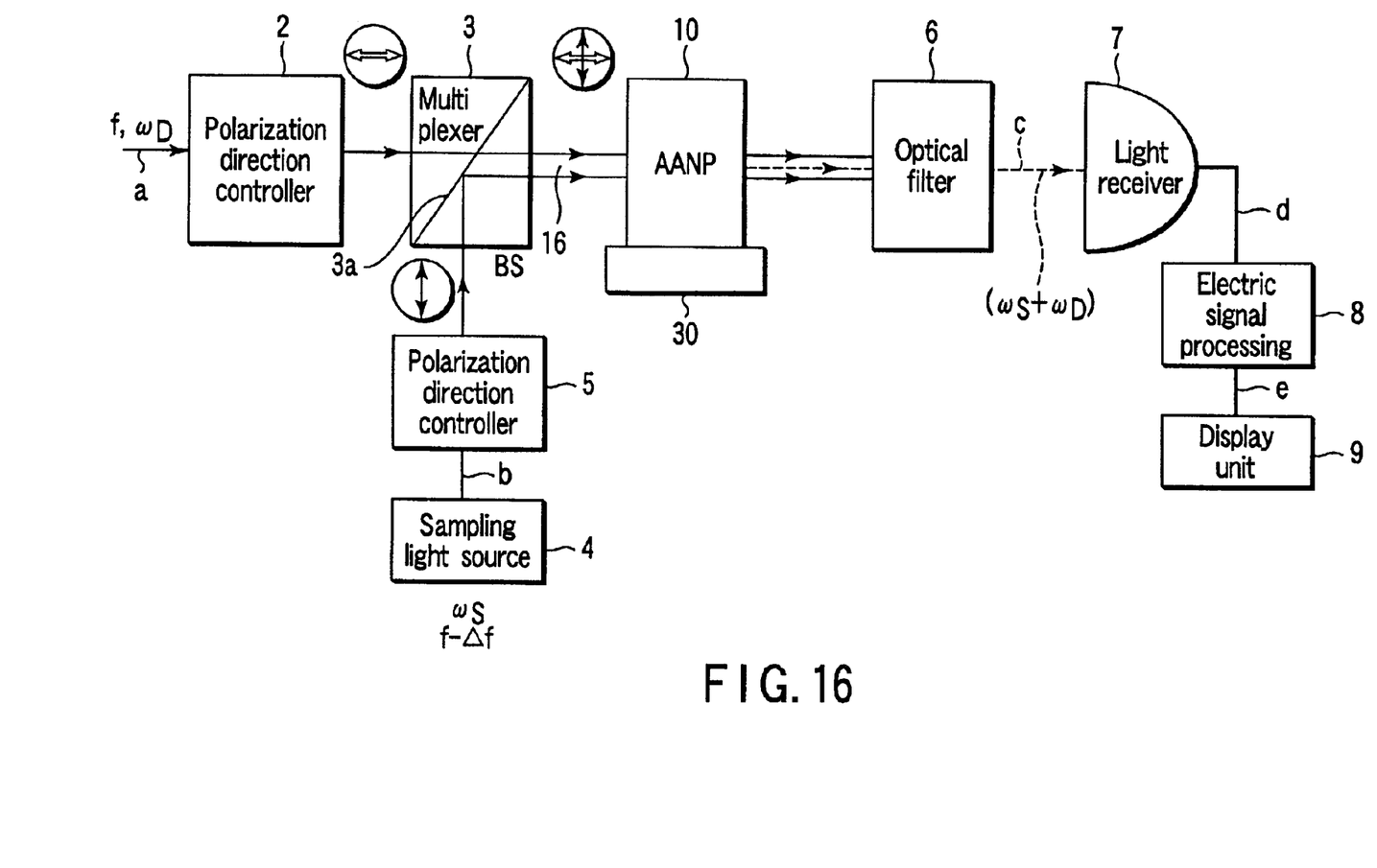
FIG. 16 is a block diagram showing a schematic structure of an optical sampling waveform measuring apparatus according to a third embodiment of the present invention.

FIG. 16 is a block diagram showing the schematic structure of an optical sampling waveform measuring apparatus according to a third embodiment of the present invention.

In FIG. 16, like reference numerals are attached to the same components as the optical sampling waveform measuring apparatus shown in FIG. 1 and a detailed description of duplicated portion is omitted.

The optical sampling waveform measuring apparatus shown in FIG. 16 is different from the optical sampling waveform measuring apparatus shown in FIG. 1 in provision of incident angle changing means 30 for changing the incident angle of the sampling light "b" and the measuring object light "a" into the AANP 10.

This incident angle changing means 30 comprises, for example, a fine rotation stage 30a with micro (μ) meter.

Figure 17:
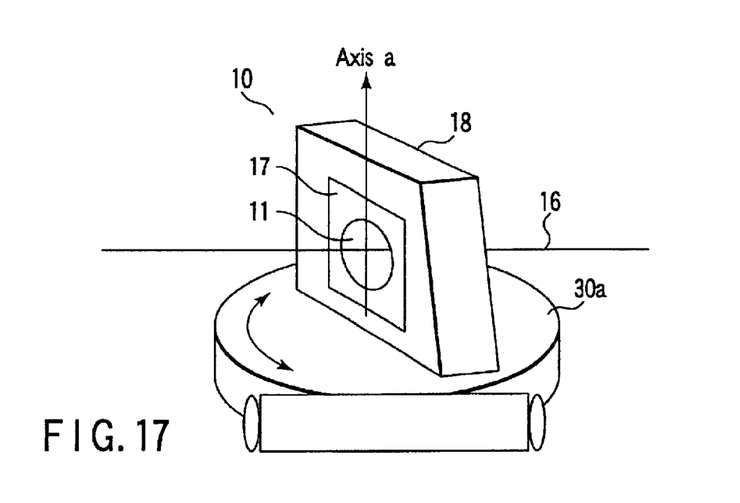
FIG. 17 is a schematic structure diagram of incident angle changing means incorporated in the optical sampling waveform measuring apparatus according to the third embodiment of the present invention.

For example, as shown in FIG. 17, the AANP 10 which is a nonlinear optical crystal, is set to the fine rotation stage 30a with micro (μ) meter, and by rotating the fine rotation stage 30a with micro (μ) meter, the incident angle of the sampling light "be" and the measuring object light "a" to be entered into the AANP 10 is changed.

Then, by with the wavelength of the sampling light "b" 1552 nm, changing the incident angle to the AANP 10 to three states, that is, a state in which the plane 11 of the AANP 10 is perpendicular to the optical axis, or states in which the plane 11 is rotated by 1° to the right/left around the axis "a" by means of the incident angle changing means 30, it is possible to realize an optical sampling waveform measuring apparatus capable of corresponding to a measuring object light "a" of a wider band than that when the light impinges perpendicular to the plane 11 as shown in FIG. 11.

As described above, in the optical sampling waveform measuring apparatus of the present invention, the optical axes of the measuring object light and sampling light are matched with the phase matching direction of the AANP which is a nonlinear optical crystal and the polarization direction of the measuring object light is set at right angle to the reference axis of the AANP crystal while the polarization direction of the sampling light is set parallel to the reference axis of the AANP crystal.

Therefore, such an optical sampling waveform measuring apparatus can suppress the change rate of the phase matching direction of the AANP which is a nonlinear optical crystal to a minimum extent even if a measuring object light having a different wavelength is entered. Consequently, the change in the measuring object light of a measured wavelength due to the change in the wavelength can be suppressed to as low as 80 nm under the band width of 3 dB. As a result, the measuring object wavelength range of an optical sampling oscilloscope can be expanded.

Further, the optical sampling waveform measuring apparatus having a sampling light source capable of emitting a sampling light of a different wavelength as a sampling light source can correspond to a measuring object light of a wider band than an apparatus which emits only a sampling light of a single kind of the wavelength.

Therefore, as described in detail above, according to the present invention, it is possible to provide an optical sampling waveform measuring apparatus suitable for a measuring object light of a wider band than that of the conventional example, in which a specific phase matching condition is applied to the AANP 10, which is a nonlinear optical crystal generating a sum frequency light of the sampling light and the measuring object light, so that the 3 dB band width of the sum frequency light generation efficiency is increased twofold or more as compared to the conventional example so as to ensure a measuring object band of 80 nm or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical sampling waveform measuring apparatus comprising:
    a sampling light source which emits a sampling light having a single polarization direction whose pulse width is smaller than that of an inputted measuring object light having a single polarization direction;
    a multiplexer which multiplexes the sampling light emitted from said sampling light source and the measuring object light on the same optical axis such that the polarization directions thereof are perpendicular to each other;
    a nonlinear optical crystal composed of 2-adamantyl-5-nitorpyridine (AANP) allowing type 2 phase matching to the sampling light and the measuring object light, which, when the sampling light and the measuring object light multiplexed by said multiplexer are entered, emits a sum frequency light of said sampling light and said measuring object light, said sum frequency light having a sum angular frequency $\omega_D+\omega_S$, based on said measuring object light having an angular frequency $\omega_D$ and said sampling light having an angular frequency $\omega_S$, with the polarization directions thereof being perpendicular to each other;
    a light receiver which converts the sum frequency light outputted from said nonlinear optical crystal to an electric signal;
    a signal processing portion which processes the electric signal outputted from said light receiver so as to display an optical pulse waveform of said measuring object light; and
    control means for, when the sum frequency light of said sampling light and said measuring object light is emitted from said nonlinear optical crystal, controlling the polarization direction of said sampling light so as to be parallel to a predetermined reference axis located within a plane perpendicular to a phase matching direction of said nonlinear optical crystal,
    wherein said predetermined reference axis is a single axis maintaining parallelism with a crystalline axis of said nonlinear optical crystal even if the wavelength of inputted light is changed.

2. An optical sampling waveform measuring apparatus according to claim 1, wherein said sampling light source is capable of emitting plural sampling lights each having a different wavelength and any one of the plural sampling lights is selected and emitted.

3. An optical sampling waveform measuring apparatus comprising:
    a sampling light source which emits a sampling light having a single polarization direction whose pulse width is smaller than that of an inputted measuring object light having a single polarization direction;
    a multiplexer which multiplexes the sampling light emitted from said sampling light source and the measuring object light on the same optical axis such that the polarization directions thereof are perpendicular to each other;
    a nonlinear optical crystal composed of 2-adamantyl-5-nitorpyridine (AANP) allowing type 2 phase matching to the sampling light and the measuring object light, which, when the sampling light and the measuring object light multiplexed by said multiplexer are entered, emits a sum frequency light of said sampling light and said measuring object light, said sum frequency light having a sum angular frequency $\omega_D+\omega_S$ based on said measuring object light having an angular frequency $\omega_D$ and said sampling light having an angular frequency $\omega_S$, with the polarization directions thereof being perpendicular to each other;
    incident angle changing means for changing an incident angle of each of the sampling light and measuring object light to be entered into said nonlinear optical crystal into said nonlinear optical crystal;
    a light receiver which converts the sum frequency light outputted from said nonlinear optical crystal to an electric signal;
    a signal processing portion which processes the electric signal outputted from said light receiver so as to display an optical pulse waveform of said measuring object light; and
    control means for, when the sum frequency light of said sampling light and said measuring object light is emitted from said nonlinear optical crystal, controlling the polarization direction of said sampling light so as to be parallel to a predetermined reference axis located within a plane perpendicular to a phase matching direction of said nonlinear optical crystal,
    wherein said predetermined reference axis is a single axis maintaining parallelism with a crystalline axis of said nonlinear optical crystal even if the wavelength of inputted light is changed.

* * * * *